United States Patent
Shauh et al.

(10) Patent No.: US 9,877,294 B2
(45) Date of Patent: Jan. 23, 2018

(54) MANAGING TUNE-AWAYS IN A MULTI-SUBSCRIPTION MULTI-STANDBY COMMUNICATION DEVICE

(71) Applicant: QUALCOMM Incorporated, San Diego, CA (US)

(72) Inventors: Jack Shyh-Hurng Shauh, San Diego, CA (US); Shailesh Maheshwari, San Diego, CA (US); Mohan Krishna Gowda, San Diego, CA (US); Kuo-Chun Lee, San Diego, CA (US); Sivaramakrishna Veerepalli, San Diego, CA (US); Alexey Semjonovs, Longmont, CO (US); Vishwanath Chukkala, San Diego, CA (US); Qiang Jiang, San Diego, CA (US); Shishir Ramesha, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 14/934,483

(22) Filed: Nov. 6, 2015

(65) Prior Publication Data

US 2017/0064662 A1 Mar. 2, 2017

Related U.S. Application Data

(60) Provisional application No. 62/212,198, filed on Aug. 31, 2015.

(51) Int. Cl.
*H04W 4/00* (2009.01)
*H04W 60/00* (2009.01)
(Continued)

(52) U.S. Cl.
CPC ....... *H04W 60/005* (2013.01); *H04L 65/4076* (2013.01); *H04W 36/14* (2013.01);
(Continued)

(58) Field of Classification Search
CPC .................. H04W 60/005; H04L 65/4076
(Continued)

(56) References Cited

U.S. PATENT DOCUMENTS 8,134,977 B2 3/2012 Parekh et al.
8,879,506 B1 11/2014 Singh et al.
(Continued)

FOREIGN PATENT DOCUMENTS

WO 2015073448 A1 5/2015

OTHER PUBLICATIONS

International Search Report and Written Opinion—PCT/US2016/049578—ISA/EPO—Oct. 21, 2016.

*Primary Examiner* — Samina Choudhry
(74) *Attorney, Agent, or Firm* — The Marbury Law Group

(57) ABSTRACT

Various embodiments include multi-subscription multi-standby (MSMS) communication devices and methods for managing a tune-away by a radio frequency (RF) resource supporting a first subscription to support a second subscription. A device processor may monitor a data loss during a first burst of a segment of a broadcast data stream received using the first subscription by the MSMS communication device. The device processor may calculate a permitted data loss of the segment of a broadcast data stream. The device processor may reserve one or more subframes in a second burst of the segment based on the permitted data loss, and the device processor may prevent a tune-away of the RF resource from the first subscription to the second subscription during the reserved one or more subframes of the second burst.

26 Claims, 8 Drawing Sheets

(51) Int. Cl.
*H04L 29/06* (2006.01)
*H04W 36/14* (2009.01)
*H04W 36/30* (2009.01)
*H04W 76/02* (2009.01)
*H04W 76/04* (2009.01)
*H04W 88/06* (2009.01)

(52) U.S. Cl.
CPC ......... *H04W 36/30* (2013.01); *H04W 76/025* (2013.01); *H04W 76/048* (2013.01); *H04W 88/06* (2013.01)

(58) Field of Classification Search
USPC ........................................................ 370/328
See application file for complete search history.

(56) References Cited

U.S. PATENT DOCUMENTS

| | | |
|---|---|---|
| 2012/0020310 A1 | 1/2012 | Ji et al. |
| 2013/0215846 A1 | 8/2013 | Yerrabommanahalli et al. |
| 2013/0260758 A1 | 10/2013 | Zhao et al. |
| 2013/0295920 A1* | 11/2013 | Viswanadham ...... H04W 36/14 455/426.1 |
| 2014/0119293 A1 | 5/2014 | Sikri et al. |
| 2014/0120925 A1 | 5/2014 | Kanthala et al. |
| 2015/0237497 A1* | 8/2015 | Chen .................... H04W 8/183 455/558 |
| 2015/0237597 A1 | 8/2015 | Kanamarlapudi et al. |

\* cited by examiner

MANAGING TUNE-AWAYS IN A MULTI-SUBSCRIPTION MULTI-STANDBY COMMUNICATION DEVICE

RELATED APPLICATIONS

This application claims the benefit of priority to U.S. Provisional Application No. 62/212,198 entitled "Managing Tune-Aways In A Multi-Subscription Multi-Standby Communication Device" filed Aug. 31, 2015, the entire contents of which are hereby incorporated by reference.

BACKGROUND

A multi-subscription multi-standby communication device may include one or more Subscriber Identity Module (SIM) cards that provide users with access to multiple separate mobile telephony networks. Each SIM may be associated with a different service provider subscription, enabling the multi-subscription multi-standby communication device to communicate with one or more communication networks. Each SIM or subscription may also be associated with a radio access technology (RAT).

A multi-subscription communication device that includes one or more SIMs and connects to two or more separate mobile telephony networks using one or more shared radio frequency (RF) resources/radios may be termed a "multi-standby" communication device. One example of a multi-subscription multi-standby communication device is a dual-SIM-dual-standby (DSDS) communication device, which includes two SIM cards that share a set of radio frequency (RF) circuitry (referred to as an "RF chain" or a "RF resource") to communicate with two separate mobile telephony networks on behalf of their respective subscriptions. Another example is a single-radio LTE (SRLTE) communication device, which includes one SIM card/subscription associated with two (or more) subscriptions that share a single shared RF resource to communicate with one or more multi-subscription multi-standby communication networks on behalf of the multiple subscriptions.

SUMMARY

Various embodiments include methods and multi-subscription multi-standby communication devices implementing methods for managing a tune-away by a radio frequency (RF) resource supporting a first subscription to support a second subscription. Various embodiments may include monitoring a data loss during a first burst of a segment of a broadcast data stream received using the first subscription by the multi-subscription multi-standby communication device, calculating a permitted data loss of the segment of the broadcast data stream, reserving one or more subframes in a second burst of the segment based on the permitted data loss, and preventing a tune-away of the RF resource from the first subscription to the second subscription during the reserved one or more subframes of the second burst. In various embodiments, the first burst and the second burst may be any two bursts within the segment. In some embodiments, the monitored data loss may include a cumulative data loss from a beginning of the segment of the broadcast data stream.

In some embodiments, calculating the permitted data loss of the segment of the broadcast data stream may include calculating the permitted data loss of the segment of the broadcast data stream based on the monitored data loss during the first burst of the segment. Some embodiments may further include determining whether the permitted data loss is greater than or equal to a number of subframes in the second burst, in which reserving one or more subframes in a second burst based on the permitted data loss may include reserving the one or more subframes in the second burst in response to determining that the permitted data loss is greater than or equal to the number of subframes in the second burst.

Some embodiments may further include permitting a tune-away of the RF resource from the first subscription to the second subscription during unreserved subframes of the second burst. In some embodiments, calculating the permitted data loss of the segment of the broadcast data stream may include receiving segment size information and an error correction factor of the segment, determining an amount of data in the segment based on the segment size information and a level of data redundancy in the segment, determining an amount of data needed to recover the segment, and calculating the permitted data loss of the segment based on the amount of data in the segment and the amount of data needed to recover the segment. Some embodiments may further include receiving a request to enable access to the RF resource by the second subscription, recalculating the permitted data loss of the segment based on the monitored data loss in the first burst, reallocating the reservation of the one or more subframes in the second burst based on the recalculated permitted data loss.

The various methods may also include monitoring a data loss during a burst of a segment of a broadcast data stream received using the first subscription by the multi-subscription multi-standby communication device, calculating a permitted data loss of the segment of the broadcast data stream, determining whether there is an upcoming overlap between a communication activity of the first subscription and a tune-away to the second subscription, determining a required tune-away duration in response to determining that there will be an overlap between the communication activity of the first subscription and the tune-away to the second subscription, determining a permitted data loss time based on the permitted data loss and the required tune-away duration, determining whether the tune-away duration is greater than the permitted data loss time, and preventing the tune-away in response to determining that the tune-away duration is greater than the permitted data loss time. In some embodiments, the monitored data loss may include a cumulative data loss from a beginning of the segment of the broadcast data stream.

Some embodiments may further include calculating the permitted data loss based on the monitored data loss during the first burst, in which determining the permitted data loss time is based on the permitted data loss and the required tune-away duration. In some embodiments, determining the permitted data loss time based on the permitted data loss and the required tune-away duration may include estimating a data loss during the required tune-away duration. In some embodiments, determining whether the tune-away duration is greater than the permitted data loss time may include determining whether the estimated data loss during the required tune-away duration is greater than the permitted data loss.

Various embodiments further include a mobile computing device having a memory, a radio frequency (RF) resource, and a processor coupled to the memory and the RF resource and configured with processor executable instructions to perform operations of the methods described above. Various embodiments include a mobile computing device having means for performing functions of the methods described above. Various embodiments include a non-transitory processor-readable storage medium having stored thereon processor-executable instructions configured to cause a processor of a mobile computing device to perform operations of the methods described above.

BRIEF DESCRIPTION OF THE DRAWINGS

The accompanying drawings, which are incorporated herein and constitute part of this specification, illustrate exemplary embodiments. Together with the general description given above and the detailed description given below, the drawings serve to explain features of various embodiments, and not to limit various embodiments.

DETAILED DESCRIPTION

Figure 1:
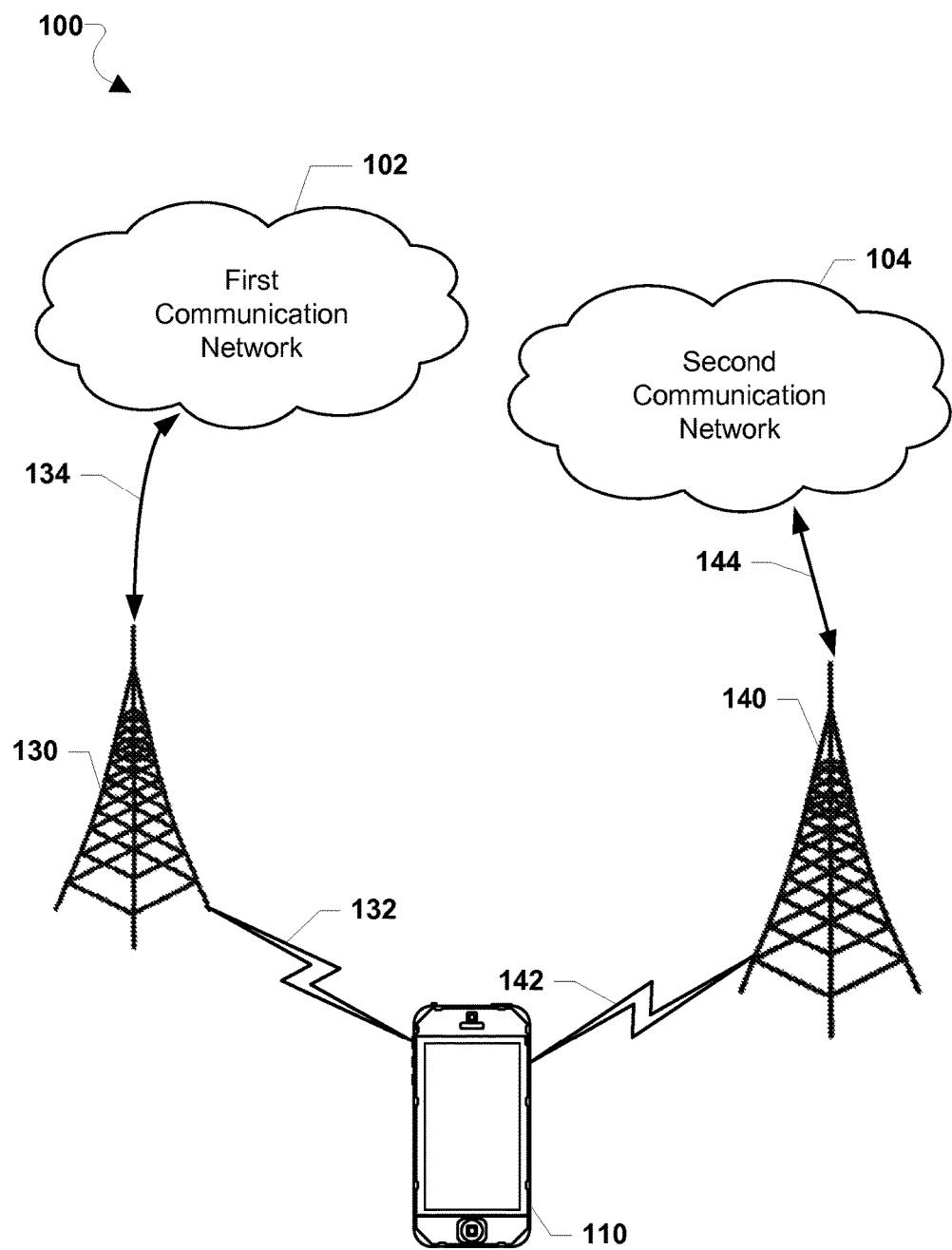
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods implemented multi-subscription multi-standby communication devices that enable reception of cell broadcasts on a first network while reducing degradation of throughput of data of an active communication session on a second network by appropriately scheduling tune-aways to the first network.

The terms "multi-subscription multi-standby communication device" and "MSMS communication device" refer to any one or all of cellular telephones, smartphones, personal or mobile multi-media players, personal data assistants, laptop computers, tablet computers, smartbooks, palmtop computers, wireless electronic mail receivers, multimedia Internet enabled cellular telephones, wireless gaming controllers, and similar electronic devices and portable computing platforms which include a programmable processor, a memory, and one or more shared RF resources, and which are configured to support communications over two or more subscriptions. Various embodiments may be particularly useful in any communication devices that can support multiple wireless wide area network subscriptions and communication sessions with two or more communication networks.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

References to "first network," "first subscription," "second network" and "second subscription" are arbitrary and are used to refer to two or more subscriptions/networks generally because at any given time either subscription/network may be in an active mode (on an active voice or data call) or a standby mode. For example, at a first time, a first subscription with a first network may be on an active data call (and thus a "first subscription") while a second subscription with a second network is in the standby mode (and thus a "second" subscription), and at a second time, the second subscription may enter an active data call (becoming the "first" subscription) and the first subscription may enter the standby mode (becoming the "second" subscription). Also, references to "first" and "second" subscriptions and networks is not intended to imply that the embodiments are limited to two subscriptions sharing one radio frequency (RF) resource, because three or more subscriptions may share one RF resource provided that only one subscription can use the RF resource at a time. Third and fourth subscriptions would behave similar to a second subscription. Therefore, in the interest of brevity, operations of subscriptions in the standby mode that share the RF resource during tune-away periods are described generally with reference to the "second" subscription.

In multi-subscription multi-standby communication devices, only one subscription may use each RF resource to communicate with its communication network at a time. Even when a subscription is in an idle mode or a standby mode, meaning the subscription is not actively communicating with the network, the subscription may still need to periodically receive access to a shared RF resource in order to perform various network operations. For example, an idle subscription may need the shared RF resource at regular intervals to perform idle mode operations, to receive network-paging messages in order to remain connected to the network, etc. on behalf of its subscription. Therefore, it is possible that at a certain times the multiple subscriptions sharing an RF resource may need to use the RF resource to communicate with their respective mobile networks simultaneously.

The multi-subscription multi-standby communication device may force a subscription that is actively using a shared RF resource to interrupt its RF operations so that an idle subscription may use the shared RF resource to perform idle-standby mode operations. This process of switching access of the shared RF resource from the active subscription to the idle subscription is sometimes referred to as a "tune-away" or a "tune-away event," as the RF resource must tune away from the frequency bands and/or channels of the active subscription and tune to frequency bands/channels of the idle subscription. After network communications via the idle subscription are complete, the communication device may switch RF resource access back from the idle subscription to the active subscription. Examples of idle-standby mode operations may include one or more of page monitoring (e.g., discontinuous reception), system information monitoring (e.g., receiving and decoding a broadcast control channel), cell reselection measurements to determine whether to initiate reselection operations to a neighboring cell, updating the second subscription network with the current location of the multi-standby communication device, receiving Short Message Service (SMS) messages, and receiving mobile-terminated calls (sometimes collectively referred to herein as tune-away operations).

During a tune-away, communication activities using a first subscription may be interrupted and data may be partially or entirely lost, which may degrade overall reception performance over the first subscription. As a result, data received from the active subscription may be lost or corrupted and thus may be difficult or impossible to decode. The tune-away may thus decrease the throughput of communications between the multi-subscription multi-standby communication device and the communication network of the active subscription, and may degrade the quality of an active communication session over the communication network. The problem of data loss during a tune-away may also impact the user experience when the first subscription is conducting communications that are particularly sensitive to latency or data loss, such as streaming media, for example, eMBMS (Evolved Multimedia Broadcast Multicast Service). Thus, operations performed by a processor of a multi-subscription multi-standby communication device may include determining whether to permit or prevent a scheduled tune-away.

A server or content provider may attempt to mitigate the effects of lost or partially received data by adding redundancy information in the content or data sent to the multi-subscription multi-standby communication device. This redundancy information may enable the multi-subscription multi-standby communication device to replace missing data and correct partial or corrupted data without requiring the content provider to retransmit the lost or incomplete data. For example, the operator may include forward error correction (FEC) data in data packets when broadcasting streaming multimedia data. Adding FEC data into data packets enables a multi-subscription multi-standby communication device to recover data that is lost or partially received as a result of tune-away operations. However, depending on the amount of media data lost or corrupted, a large amount of FEC data may be needed to recover the data loss. Further, the transmission of error correction data consumes communication bandwidth that could otherwise be used for data transmission, and a large network overhead for transmitting error correction data is undesirable.

Various embodiments enable a processor of a multi-subscription multi-standby communication device to permit or to block a scheduled tune-away based on current and estimated data reception to improve to data reception during a tune-away event. Typically, tune-aways are periodically scheduled according to a timing dictated by a RAT. However, a processor of a multi-subscription multi-standby communication device may determine whether to permit or prevent a given tune-away.

Media files may be divided into segments for transport to the communication device. Each segment may be sent to the communication device in a number of bursts. Each burst includes a number of subframes. Data in a segment (segment data) may include media data (e.g., content data) and error correction data (such as forward error correction (FEC) data) that may enable the receiver device to recover a segment when some media data is lost or corrupted during transmission. Thus, in many cases, the multi-subscription multi-standby communication device does not need to receive all of the data of the segment in order to recover the segment because error correction data in the received portions of the segment can be used to recover the segment from less than all of the media data. In some embodiments, the multi-subscription multi-standby communication device may calculate or determine a permitted data loss from a segment based on an amount of media data or content data and an amount of error correction data in the segment.

In various embodiments, the multi-subscription multi-standby communication device may monitor an amount of streaming data received in each burst of a segment of a broadcast data stream, and the multi-subscription multi-standby communication device may determine an amount of data loss (i.e., an amount of data lost from a segment of the broadcast data stream) during a first burst of the segment. The multi-subscription multi-standby communication device may further determine that a tune-away is upcoming.

The multi-subscription multi-standby communication device may permit the upcoming tune-away when the multi-subscription multi-standby communication device receives sufficient data to recover (e.g., decode) the segment. The amount of data needed to recover the segment may be considered a first threshold. Thus, the multi-subscription multi-standby communication device may permit the upcoming tune-away when the multi-subscription multi-standby communication device determines that an amount of data loss is less than or equal to the first threshold. Sufficient data may include sufficient media data to recover the segment. Sufficient data may also include sufficient media data and error correction data to recover the segment.

The multi-subscription multi-standby communication device may also permit the upcoming tune-away when the amount of data lost is so great that the multi-subscription multi-standby communication device cannot recover the segment even using the error correction data. In such case, the multi-subscription multi-standby communication device may permit the upcoming tune-away because preventing the upcoming tune-away will not enable the multi-subscription multi-standby communication device to receive sufficient segment data to recover the segment. An amount of data loss that prevents the multi-subscription multi-standby communication device from recovering the segment may be considered a second threshold. Thus, the multi-subscription multi-standby communication device may permit the upcoming tune-away when the multi-subscription multi-standby communication device determines that an amount of data loss is greater than or equal to the second threshold.

The multi-subscription multi-standby communication device may also determine that the amount of data loss is greater than the first threshold, and that the amount of data loss is less than the second threshold. If the amount of data losses between the first and second threshold, the multi-subscription multi-standby communication device may determine whether to permit or to prevent the upcoming tune-away during certain subframes of a next burst of the segment. The multi-subscription multi-standby communication device may calculate a maximum amount of data that may be lost yet the multi-subscription multi-standby communication device may recover the segment (a permitted data loss). The multi-subscription multi-standby communication device may also monitor the data loss during a first burst of the segment. Based on the permitted data loss, the multi-subscription multi-standby communication device may reserve one or more subframes in a second burst of a segment. The multi-subscription multi-standby communication device may prevent the tune-away during the one or more reserved subframes of the second burst. The multi-subscription multi-standby communication device may permit the tune-away during one or more unreserved subframes of the second burst.

In some embodiments, the multi-subscription multi-standby communication device may monitor the data loss in the first burst, and the multi-subscription multi-standby communication device may calculate a permitted data loss based on the data loss in the first burst. In some embodiments, the multi-subscription multi-standby communication device may determine whether the permitted data loss is greater than or equal to a number of subframes in the second burst. In response to determining that the permitted data loss is greater than or equal to the number of subframes in the second burst, in some embodiments, the multi-subscription multi-standby communication device may reserve subframes of the second burst according to the permitted data loss. In various embodiments, reserving the subframes of the second burst may include assigning a high priority to the reserved subframes. In some embodiments, assigning the high priority to the reserved subframes may include assigning the reserved subframes to a high priority client of the multi-subscription multi-standby communication device. In various embodiments, the multi-subscription multi-standby communication device may assign a low priority to unreserved subframes of the second burst. In some embodiments, assigning the low priority to the unreserved subframes of the second burst may include assigning the unreserved subframes to a low priority client of the multi-subscription multi-standby communication device.

In some embodiments, the multi-subscription multi-standby communication device may recalculate the permitted data loss while the multi-subscription multi-standby communication device is receiving the first burst, and may reallocate the reservation of subframes of the second burst based on the recalculated permitted data loss. In some embodiments, the multi-subscription multi-standby communication device may recalculate the permitted data loss responsive to a request (e.g., from a resource manager of the multi-subscription multi-standby communication device) to enable access to a shared RF resource by a second subscription. Thus, the multi-subscription multi-standby communication device may dynamically reallocate the reservation of the subframes of the second burst based on an amount of data of the first burst actually received by the multi-subscription multi-standby communication device. In so doing, the multi-subscription multi-standby communication device may dynamically increase or decrease a number of subframes of the second burst in which the multi-subscription multi-standby communication device may permit the tune-away.

In various embodiments, the multi-subscription multi-standby communication device may determine whether there is an upcoming overlap in time (a collision) between a communication activity of the first subscription and a communication activity of the second subscription. For example, the communication activity of the first subscription may include receiving data (such as streaming media data), and the communication activity of the second subscription may include performing a tune-away to conduct one or more communication activities using the second subscription. The multi-subscription multi-standby communication device may also determine a duration of time is required for the tune-away. The multi-subscription multi-standby communication device may further determine an amount of data that will be lost during the tune-away duration. In some embodiments, to accurately calculate the amount of data that will be lost during the tune-away duration, the multi-subscription multi-standby communication device may also consider time periods during which the RF resource is being tuned away from, and back to, the first subscription. In some embodiments, the multi-subscription multi-standby communication device may determine a duration of time during which the RF resource may be permitted to tune-away (a permitted data loss time). In such embodiments, the multi-subscription multi-standby communication device may prevent the tune-away in response to determining that the tune away duration is greater than the permitted data loss time. In some embodiments, the multi-subscription multi-standby communication device may estimate an amount of data loss during the required tune-away duration. In such embodiments, the multi-subscription multi-standby communication device may prevent the tune-away in response to determining that the estimated data loss during the tune-away duration is greater than the permitted data loss.

Various embodiments may be implemented in multi-subscription multi-standby communication devices that may operate within a variety of communication systems particularly systems that include two or more communication networks. FIG. 1 illustrates a communication system 100 suitable for use with various embodiments. A multi-subscription multi-standby communication device 110 may communicate with the first communication network 102 through a communication link 132 to the first base station 130. In some embodiments, the multi-subscription multi-standby communication device 110 may include a multi-subscription multi-standby (MSMS) communication device. The multi-subscription multi-standby communication device 110 may also communicate with the second mobile network 104 through a communication link 142 to the second base station 140. The first base station 130 may communicate with the first communication network 102 over a wired or wireless communication link 134, and the second base station 140 may communicate with the second communication network 104 over a wired or wireless communication link 144. The communication links 134 and 144 may include fiber optic backhaul links, microwave backhaul links, and other similar communication links.

Each of the communication networks 102 and 104 may support communications using one or more RATs, and each of the wireless communication links 132 and 142 may include cellular connections that may be made through two-way wireless communication links using one or more RATs. Examples of RATs may include 3GPP Long Term Evolution (LTE), Global System for Mobility (GSM), Worldwide Interoperability for Microwave Access (Wi-MAX), Code Division Multiple Access (CDMA), WCDMA, Time Division Multiple Access (TDMA), Single-Carrier Radio Transmission Technology (1×RTT), Evolution-Data Optimized (EV-DO), and other RATs. While the communication links 132 and 142 are illustrated as single links, each of the communication links may include a plurality of frequencies or frequency bands, each of which may include a plurality of logical channels. Additionally, each of the communication links 132 and 142 may utilize more than one RAT.

Figure 2:
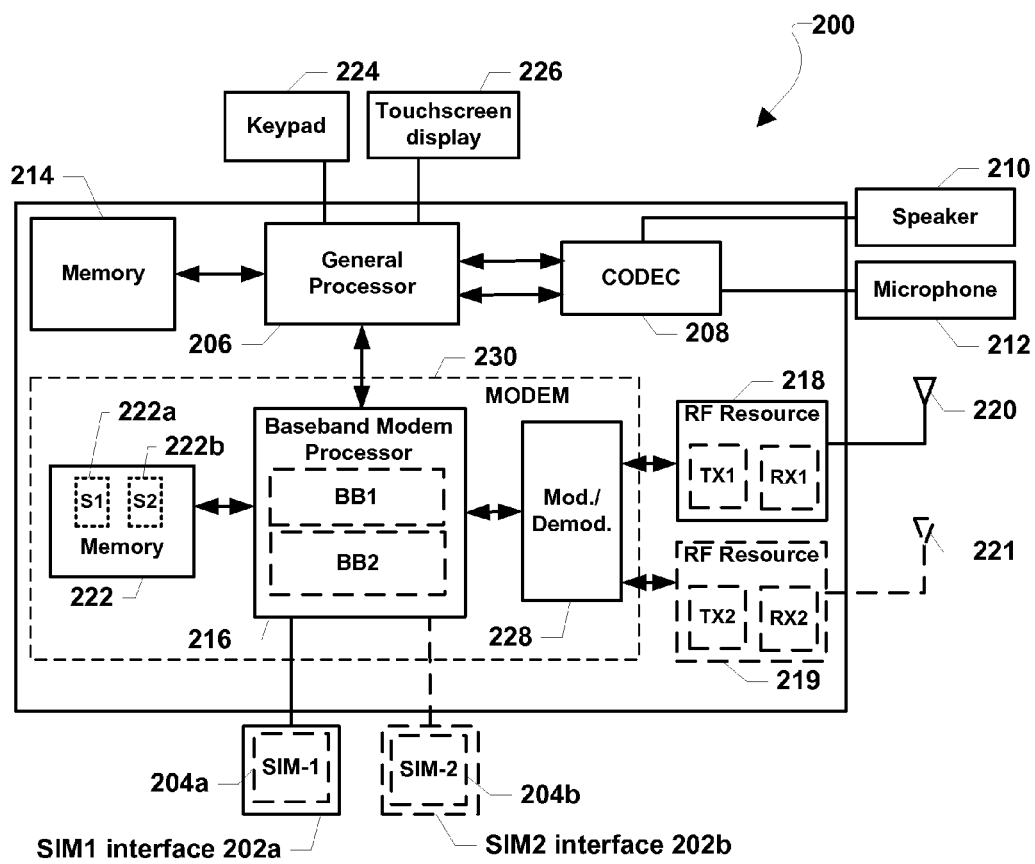
FIG. 2 is a component block diagram of a multi-subscription multi-standby communication device according to various embodiments.

FIG. 2 is a component block diagram of a multi-subscription multi-standby communication device 200 suitable for implementing various embodiments. With reference to FIGS. 1 and 2, in various embodiments, the multi-subscription multi-standby communication device 200 may be similar to the multi-subscription multi-standby communication device 110. The multi-subscription multi-standby communication device 200 may include a first SIM interface 202a, which may receive a first identity module SIM-1 204a that may be associated with a first subscription. The multi-subscription multi-standby communication device 200 may optionally also include a second SIM interface 202b, which may receive a second identity module SIM-2 204b that may be associated with a second subscription.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The multi-subscription multi-standby communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to the RF resource 218 for transmission. The modulator/demodulator 228 may also extract an information-bearing signal from a modulated carrier wave received from the RF resource 218, and may provide the demodulated signal to the baseband modem processor 216. The modulator/demodulator 228 may be or include a digital signal processor (DSP).

In some optional embodiments, the multi-subscription multi-standby communication device 200 may include an optional RF resource 219 configured similarly to the RF resource 218 and coupled to an optional wireless antenna 221. In such embodiments, the multi-subscription multi-standby communication device 200 may leverage the multiple RF resources 218, 219 and antennae 220, 221 to perform diversity receiver reception during a tune-away event.

The baseband modem processor 216 may read and write information to and from the memory 222. The memory 222 may also store instructions associated with a protocol stack, such as protocol stack S1 222a and protocol stack S2 222b. The protocol stacks S1 222a, S2 222b generally include computer executable instructions to enable communication using a radio access protocol or communication protocol. Each protocol stack S1 222a, S2 222b typically includes network protocol layers structured hierarchically to provide networking capabilities. The modem 230 may include one or more of the protocol stacks S1 222a, S2 222b to enable communication using one or more RATs. The protocol stacks S1 222a, S2 222b may be associated with a SIM card (e.g., SIM-1 204a, SIM-2 204b) configured with a subscription. For example, the protocol stack S1 222a and the protocol stack S2 222b may be associated with the SIM-1 204a. The illustration of only two protocol stacks S1 222a, S2 222b is not intended as a limitation, and the memory 222 may store more than two protocol stacks (not illustrated).

Each SIM and/or RAT in the multi-subscription multi-standby communication device 200 (e.g., SIM-1 204a, SIM-2 204b) may be coupled to the modem 230 and may be associated with or permitted to use an RF resource. The term "RF resource" may be used to refer to all of the circuitry used to send and/or receive RF signals, which may include the baseband modem processor 216 that performs baseband/modem functions for communicating with/controlling a RAT, one or more radio units including transmitter and receiver components that are shown as RF resource 218, and optional RF resource 219, one or more of the wireless antenna 220 and the optional wireless antenna 221, and additional circuitry that may include one or more amplifiers and radios. In some embodiments, an RF resource may share a common baseband modem processor 216 (i.e., a single device that performs baseband/modem functions for all RATs on the multi-subscription multi-standby communication device). In some embodiments, each RF resource may include the physically or logically separate baseband processors (e.g., BB1, BB2).

The RF resources 218, 219 may include transceivers associated with one or more RATs and may perform transmit/receive functions for the multi-subscription multi-standby communication device 200 on behalf of their respective RATs. The RF resources 218, 219 may include separate transmit and receive circuitry. In some embodiments, the RF resource 218b may include only receive circuitry. The RF resources 218, 219 may each be coupled to a wireless antenna (e.g., the first wireless antenna 220 and the second wireless antenna 221). The RF resources 218, 219 may also be coupled to the modem 230 (e.g., via the modulator/demodulator 228, the baseband modem processor 216, or another component).

In some embodiments, the general-purpose processor 206, memory 214, baseband processor(s) 216, and the RF resources 218, 219 may be included in the multi-subscription multi-standby communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the multi-subscription multi-standby communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-subscription multi-standby communication device 200 to enable communication between them.

Functioning together, the two SIMs 204a, 204b, the baseband processor(s) 216, RF resources 218, 219, and the antennas 220, 221 may enable communications on two or more RATs. For example, one SIM, baseband processor, and RF resource may be configured to support two different RATs. In some embodiments, more RATs may be supported on the multi-subscription multi-standby communication device 200 by adding more SIM cards, SIM interfaces, RF resources, and antennas for connecting to additional mobile networks.

The multi-subscription multi-standby communication device 200 may optionally include a tune-away management unit configured to manage the respective access of subscriptions associated with the first and second SIMs 204a, 204b to the RF resource 218 (and optionally the RF resource 219) in anticipation of or during a tune-away event. In some embodiments, the tune-away management unit may determine whether to initiate a tune-away from a first subscription to a second subscription or whether to prevent or block a tune-away in order to improve data reception on the first subscription during the duration of the tune-away. In some embodiments, the tune-away management unit may be implemented within the general-purpose processor 206. In other embodiments, the tune-away management unit 230 may be implemented as a separate hardware component (i.e., separate from the general-purpose processor 206). In some embodiments, the tune-away management unit may be implemented as a software application stored within the memory 214 and executed by the general-purpose processor 206

Figure 3:
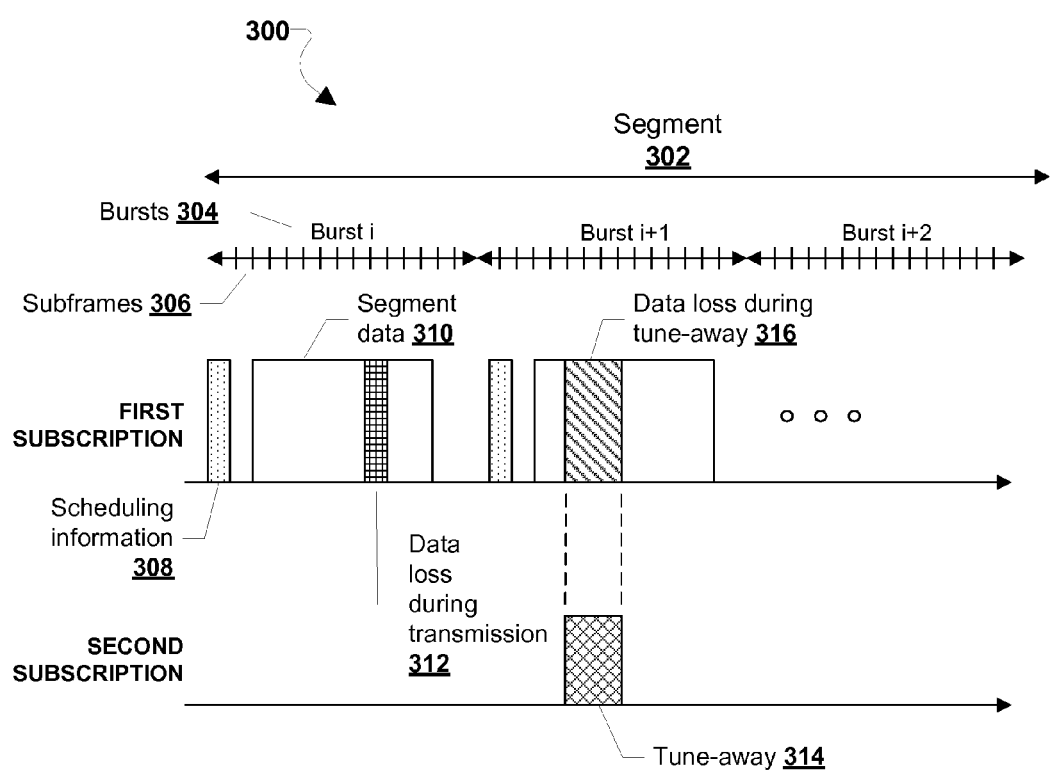
FIG. 3 is a timeline illustrating a reception of a segment by an RF resource of a multi-subscription multi-standby communication device according to various embodiments.

FIG. 3 illustrates a timeline 300 of a reception of a segment on a multi-subscription multi-standby communication device of FIGS. 1 and 2 according to some embodiments. With reference to FIGS. 1-3, a media file may be divided into portions for transport to the multi-subscription multi-standby communication device. For example, in the Dynamic Adaptive Streaming over HTTP (DASH) protocol, the media file may be divided into segments 302. Each segment may be sent to the communication device in one or more bursts 304. Each burst may include one or more subframes 306. Data in a segment (segment data) may include media data (e.g., content data) and error correction data (such as forward error correction (FEC) data) that may enable the receiver device to recover a segment when some media data is lost or corrupted during transmission.

The multi-subscription multi-standby communication device (e.g., the multi-subscription multi-standby communication devices 110 and 200) may conduct communications using a first subscription. For example, the multi-subscription multi-standby communication device may receive a broadcast data stream using the first subscription. In some embodiments, the multi-subscription multi-standby communication device may receive scheduling information 308 for the broadcast data stream (for example, multicast traffic channel (MCH) scheduling information (MSI)). The scheduling information may include information about the content each burst, such as an allocation of information in each subframe of the burst, timing information about the burst (such a beginning and an end of each burst, which subframes include media data, which subframes include error correction data), and other burst information.

Following the scheduling information 308, the multi-subscription multi-standby communication device may receive segment data 310. The segment data 310 may include media data and/or error correction data (such as forward error correction (FEC) data) that may enable the multi-subscription multi-standby communication device to recover a segment when some media data is lost or corrupted during transmission (for example, data loss during transmission 312).

A processor (e.g., the general-purpose processor 206 and/or the baseband modem processor 216) of the multi-subscription multi-standby communication device (i.e., a device processor) may also cause the device to perform a tune-away 314 from the first subscription to a second subscription. Typically, tune-aways are periodically scheduled according to a timing dictated by a RAT. During the tune-away, an amount of data transmitted on the first subscription may be lost or corrupted and thus may be difficult or impossible to decode (for example, the data loss during tune-away 316). The tune-away may thus decrease the throughput of communications between the multi-subscription multi-standby communication device and the communication network of the active subscription, and may degrade the quality of an active communication session over the communication network. The problem of data loss during a tune-away may also impact the user experience when the first subscription is conducting communications that are particularly sensitive to latency or data loss, such as streaming media. Thus, in various embodiments, the device processor may determine whether to permit or prevent a given tune-away.

Figure 4:
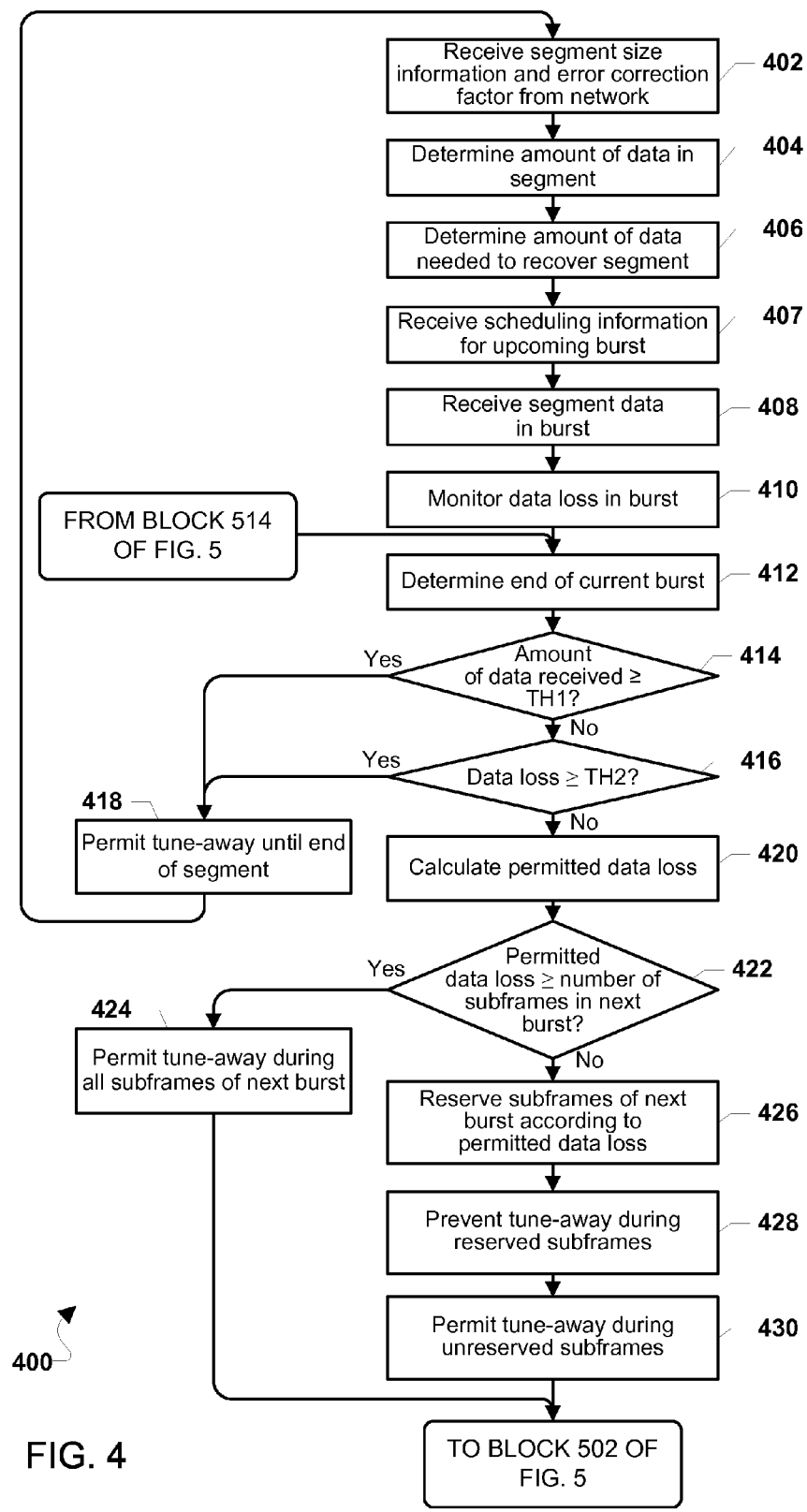
FIGS. 4 and 5 are a process flow diagram illustrating a method for managing a tune-away by an RF resource of a multi-subscription multi-standby communication device according to various embodiments.
Figure 5:
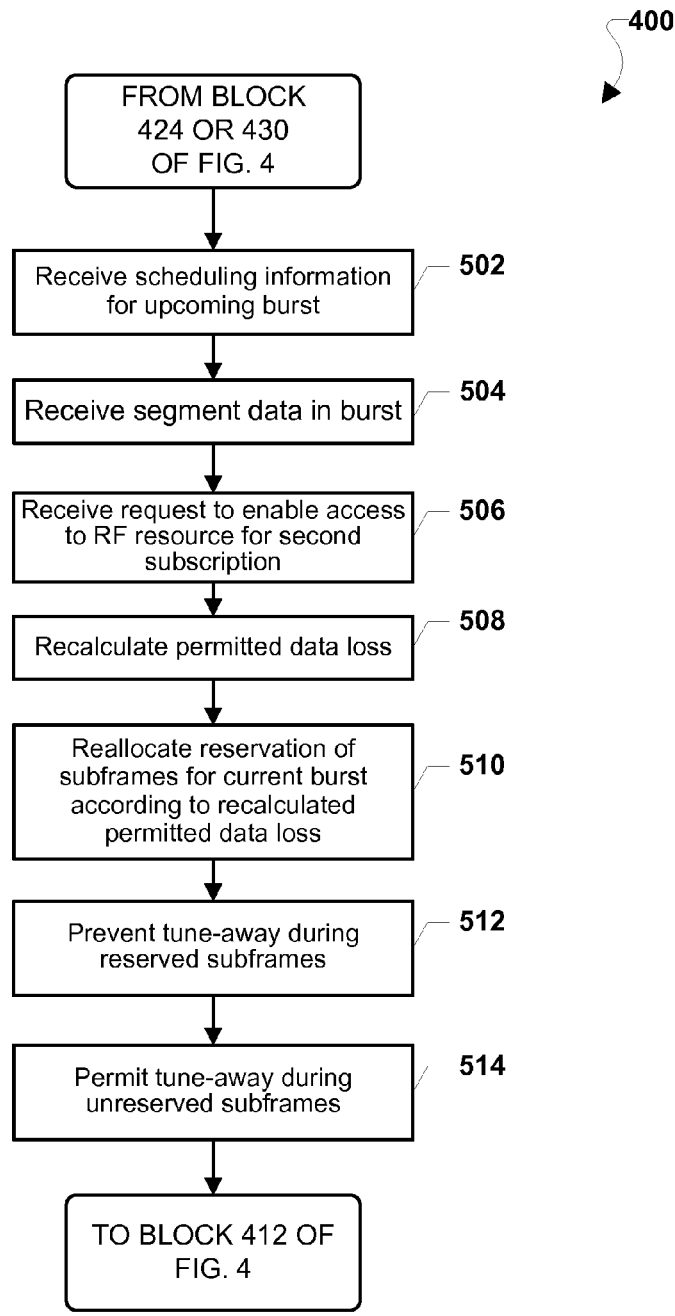

FIGS. 4 and 5 illustrate a method 400 for managing a tune-away by an RF resource of a multi-subscription multi-standby communication device according to some embodiments. With reference to FIGS. 1-5, the method 400 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor).

The multi-subscription multi-standby device may receive a broadcast data stream over the first subscription. A media file may be divided into segments 302 for transport to the multi-subscription multi-standby communication device. Each segment may be sent to the communication device in one or more bursts 304. The multi-subscription multi-standby communication device may also receive information about the segment from the network, such as a File Delivery Table (FDT), which may describe various segment attributes, such as content length, media type, encoding, file name, and other attributes.

In block 402, the device processor may receive segment size information and an error correction factor (e.g., from the first communication network over the first subscription). In some embodiments, the device processor may determine a segment size (e.g., "SegSize") from information in the File Delivery Table, such as the content length. In some embodiments, the error correction factor (which may be represented as "A") may be related to the amount of data that the device processor must receive in order to recover the media data. The error correction factor may be a coding parameter (such as a Raptor code) that may be preselected by the network or by the device processor. In some embodiments, the device processor may also determine an amount of error correction data, which may include a level of data redundancy of the media data (e.g., "$P_{FEC}$"). The level of data redundancy may be received by the communication device from the network.

In block 404, the device processor may determine an amount of data in the segment. In some embodiments, the device processor may determine the amount of data in the segment using the content length information from the File Delivery Table, as well as the level of redundancy (e.g., $P_{FEC}$) received from the network.

In block 406, the device processor may determine an amount of data needed to recover the segment. In some embodiments, the device processor may determine the amount of data needed to recover the segment using the content length information and the error correction factor (e.g., factor "A") received from the network. For example, the device processor may receive media data of the segment that is sent over a plurality of bursts (e.g., the bursts 304), and the device processor may reassemble the media data for presentation at the multi-subscription multi-standby communication device. Segment data may also include error correction data that may enable the receiver device to recover a segment when some media data is lost or corrupted during transmission. Thus, in many cases the device processor may only need to receive a certain amount of media data of the segment, which the device processor may use to recover the most or all of the media data of the segment using the error correction data.

In block 407, the device processor may receive scheduling information for an upcoming burst (e.g., the burst i). In some embodiments, the device processor may receive scheduling information for the broadcast data stream. In some embodiments, the scheduling information 308 may be associated with a burst of the segment (e.g., the burst i).

In block 408, the device processor may begin to receive segment data in the burst (e.g., the burst i). In block 410, the device processor may monitor data loss in the burst. For example, as segment data is received, the device processor may increment or calculate an amount of segment data that the device processor does not receive in the burst. In some embodiments, the monitored data loss may be represented as "Nlos". In some embodiments, the monitored data loss may include a cumulative data loss of segment data from the beginning of the segment (e.g., including data lost from all bursts of the segment received thus far).

In block 412, the device processor may determine that the end of the current burst has been reached. In determination block 414, the device processor may determine whether an amount of segment data received in the burst is greater than or equal to a first threshold. In some embodiments, the first threshold may represent the amount of data that the device processor needs to recover the segment. In some embodiments, the first threshold may be represented as in the following equation:

$$Nrx \geq SegSize * A,$$

where "Nrx" represents the amount of data received, "SegSize" represents the content length determined from the File Delivery Table, and "A" represents the error correction factor (e.g., an FEC factor).

In response to determining that the data loss is greater than or equal to the first threshold (i.e., determination block 414="Yes"), the device processor may permit a tune-away until the end of the segment (i.e., a tune-away of the RF resource from the first subscription to the second subscription) in block 418. The device processor may return to block 402, and the device processor may receive segment size information and error correction factor information from the network.

In response to determining that the data loss is not less than or equal to the first threshold (i.e., determination block 414="No"), the device processor may determine whether the data loss is greater than or equal to a second threshold in determination block 416. In some embodiments, the second threshold may represent an amount of data loss that is so great that the device processor cannot recover the segment even using the error correction data. In some embodiments, the second threshold may be represented as in the following equation:

$$Nlos \geq SegSize * (Pfec - A + 1).$$

In a case when the data loss is at or beyond the point where the device processor can no longer recover the segment, the device processor may permit the upcoming tune-away because preventing the upcoming tune-away would prevent the device processor from performing communication activities on the second subscription, and also would not enable the device processor to receive sufficient segment data to recover the segment. Thus, in response to determining that the data loss is greater than or equal to the second threshold (i.e., determination block 416="Yes"), the device processor may permit a tune-away during the next burst in block 418. The device processor may return to block 402, and the device processor may receive segment size information and error correction factor information from the network.

In response to determining that the data loss is not greater than or equal to the second threshold (i.e., determination block 416="No"), the device processor may calculate a permitted data loss in block 420. The permitted data loss may include an amount of media data of the segment that the device processor may not receive, and yet still recover most or all of the media data of the segment. In some embodiments, the device processor may calculate the permitted data loss from a segment based on the amount of media data in the segment and an amount of error correction data in the segment.

For example, the device processor may determine a value "$N_{max\_data\_loss}$" that may be represented as in the following equation:

$$N_{max\_data\_loss} = SegSize * (P_{FEC} - A + 1) - Nlos - G$$

where "G" represents a comfort margin or safety margin of an additional amount of data beyond the minimum amount of data that the device processor must receive in order to recover the media data.

In determination block 422, the device processor may determine whether the permitted data loss is greater than or equal to a number of subframes in the next burst. The number of subframes in a burst may represent the data carrying capacity of such burst, where the structure of each subframe and the structure of the burst are known. Thus, the device processor may determine whether the next subframe is capable of carrying sufficient segment data to enable the device processor to recover the segment. In response to determining that the permitted data loss is greater than or equal to the number of subframes in the next burst (i.e., determination block 422="Yes"), the device processor may permit a tune-away (i.e., a tune-away of the RF resource from the first subscription to the second subscription) during all the subframes of the next burst in block 424. The device processor may then proceed to block 502 (FIG. 5), further discussed below.

In response to determining that the permitted data loss is not greater than or equal to the number of subframes in the next burst (i.e., determination block 422="No"), the device processor may reserve subframes of the next burst according to the permitted data loss in block 426. In block 428, the device processor may prevent a tune-away during the reserved subframes of the next burst. In block 430, the device processor may permit a tune-away during the unreserved subframes of the next burst. The device processor may then proceed to block 502 (FIG. 5), further discussed below.

In various embodiments, reserving the subframes of the burst may include assigning a high priority to the reserved subframes. In some embodiments, assigning the high priority to the reserved subframes may include assigning the reserved subframes to a high priority client of the multi-subscription multi-standby communication device. In various embodiments, the multi-subscription multi-standby communication device may assign a low priority to unreserved subframes of a burst. In some embodiments, assigning the low priority to the unreserved subframes of the burst may include assigning the unreserved subframes to a low priority client of the multi-subscription multi-standby communication device. In some embodiments, a resource manager of a streaming media client on the multi-subscription multi-standby communication device may allocate a high priority or a low priority to subframes of the next burst. In some embodiments, the resource manager may reserve various subframes for the high priority client or the low priority client.

The method 400 continues as illustrated in FIG. 5. In block 502, the device processor may receive scheduling information for an upcoming burst (e.g., the burst i+1). In block 504, the device processor may begin to receive segment data in the burst (e.g., the burst i+1).

In block 506, the device processor may receive a request to enable access to the RF resource for the second subscription. For example, the device processor may receive a request related to an upcoming tune-away to enable or permit the second subscription to use the RF resource to conduct communication activities with a communication network related to the second subscription (e.g., the second communication network 104).

In block 508, the device processor may recalculate the permitted data loss. For example, the device processor may recalculate the permitted data loss using the amount of data in the segment and the amount of segment data received thus far, and/or the monitored data loss in the segment thus far. As another example, Recalculating the permitted data loss may enable the device processor to dynamically update the amount of permitted data loss based on segment data actually received and/or lost during the burst.

In block 510, the device processor may reallocate the reservation of the one or more subframes of the current burst according to the recalculated permitted data loss. For example, based on an amount of data received since the beginning of the current burst, the device processor may reduce the number of reserved subframes for the remainder of the current burst.

In block 512, the device processor may prevent a tune-away during the reserved subframes of the current burst. In block 514, the device processor may permit a tune-away during the unreserved subframes of the current burst. The device processor may continue to receive segment data, and the device processor may determine that the end of the current burst has been reached in block 412 of FIG. 4.

Figure 6:
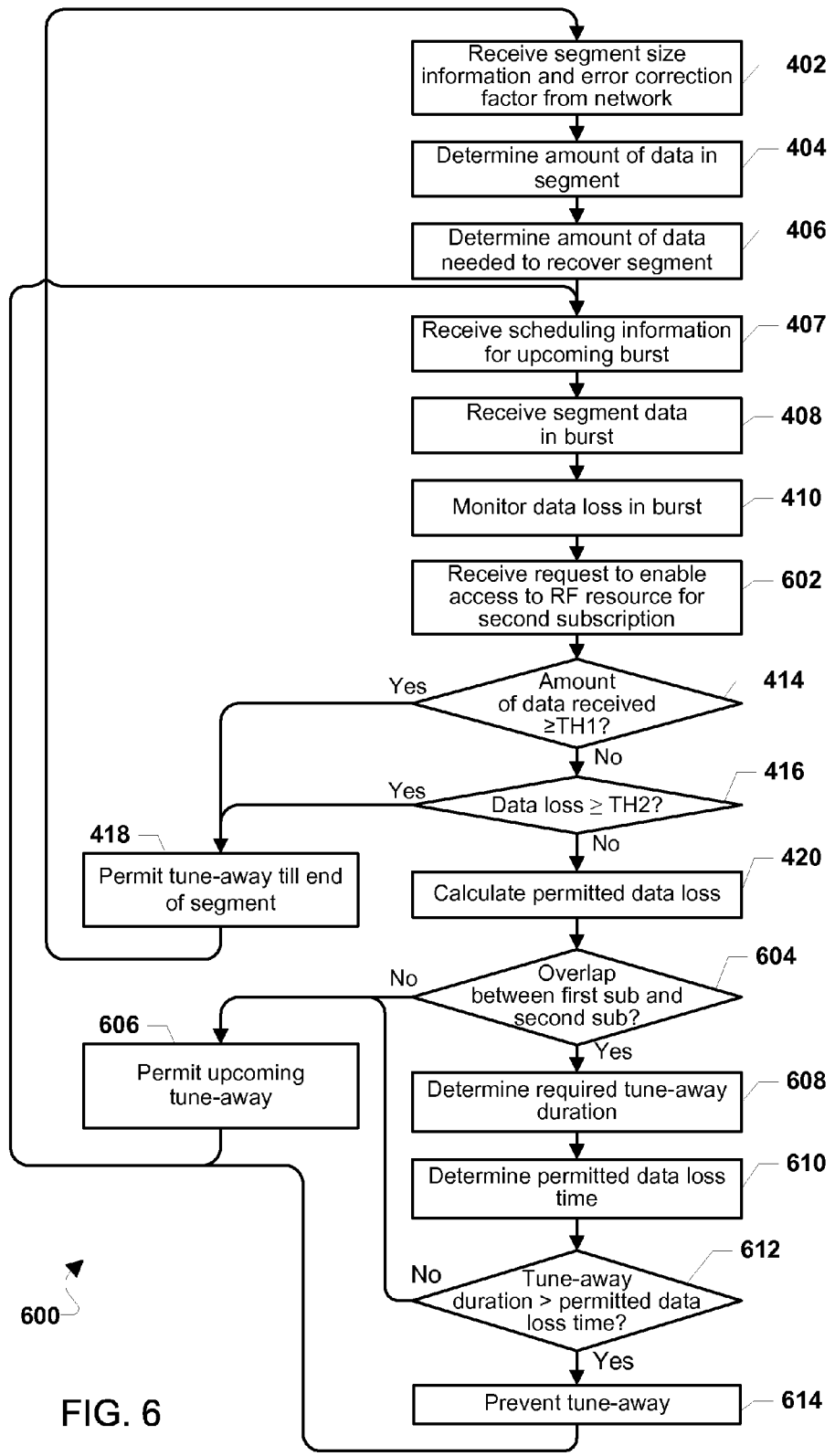
FIG. 6 is a process flow diagram illustrating another method for managing a tune-away by an RF resource of a multi-subscription multi-standby communication device according to various embodiments.

FIG. 6 illustrates a method 600 for managing a tune-away by an RF resource of a multi-subscription multi-standby communication device according to some embodiments. With reference to FIGS. 1-6, the method 600 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420, the device processor may perform operations of like-numbered blocks of the method 400 as described.

In block 602, the device processor may receive a request to enable access to the RF resource for the second subscription. For example, the device processor may receive a request related to an upcoming tune-away to enable or permit the second subscription to use the RF resource to conduct communication activities with a communication network related to the second subscription (e.g., the second communication network 104).

In determination block 604, the device processor may determine whether there is an upcoming overlap between the first subscription and the second subscription. The overlap may include at least a partial overlap in time (a collision) between a communication activity of the first subscription and a communication activity of the second subscription. In some embodiments, the communication activity of the first subscription may include receiving data, such as streaming media data. In some embodiments, the communication activity of the second subscription may include performing a tune-away to conduct one or more communication activities using the second subscription.

In response to determining that there is no upcoming overlap between the first subscription and the second subscription (i.e., determination block 604="No"), the device processor may permit an upcoming tune-away, in block 606. The device processor may then return to block 407, and the device processor may receive scheduling information for an upcoming burst.

In response to determining that there is an upcoming overlap between the first subscription and the second subscription (i.e., determination block 602="Yes"), the device processor may determine a required tune-away duration in block 608. In some embodiments, the required tune-away duration may include time periods during which the RF resource is being tuned away from, and back to, the first subscription, in order to more accurately calculate the amount of data that will be lost during the tune-away duration.

In block 610, the device processor may determine a permitted data loss time. The permitted data loss time may be based on the calculated permitted data loss (i.e., the amount of media data of the segment that the device processor may lose, and yet still recover most or all of the media data of the segment).

In determination block 612, the device processor may determine whether the tune-away duration is greater than the permitted data loss time. In response to determining that the tune-away duration is not greater than the permitted data loss time (i.e., determination block 612="No"), the device processor may permit the upcoming tune-away in block 606. The device processor may then return to block 407, and the device processor may receive scheduling information for an upcoming burst.

In response to determining that the tune-away duration is greater than the permitted data loss time (i.e., determination block 612="Yes"), the device processor may prevent the upcoming tune-away in block 614. Preventing the upcoming tune-away may enable the device processor to receive additional segment data. The device processor may then return to block 407, and the device processor may receive scheduling information for an upcoming burst.

Figure 7:
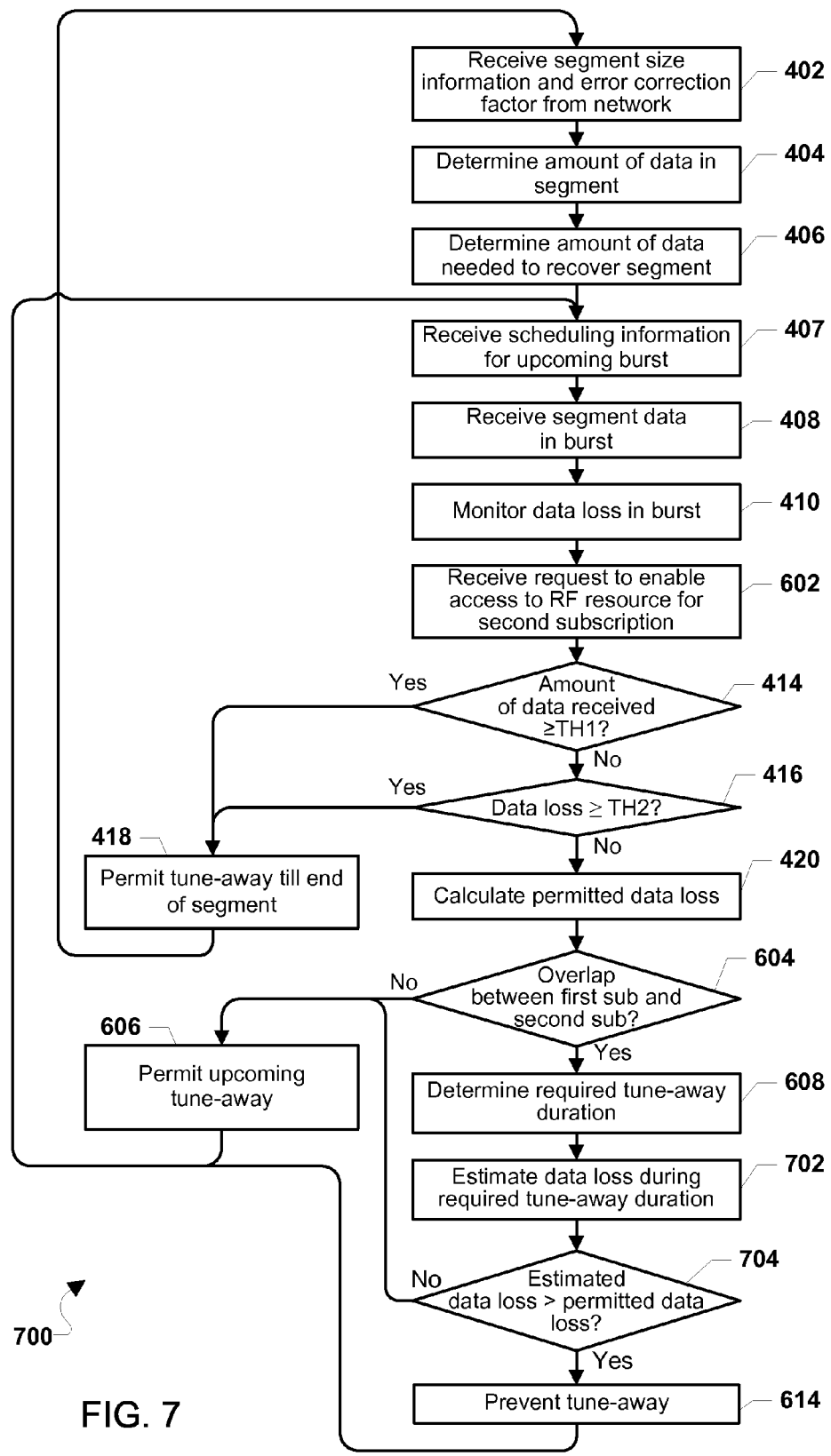
FIG. 7 is a process flow diagram illustrating another method for managing a tune-away by an RF resource of a multi-subscription multi-standby communication device according to various embodiments.

FIG. 7 illustrates a method 700 for managing a tune-away by an RF resource of a multi-subscription multi-standby communication device according to some embodiments. With reference to FIGS. 1-7, the method 700 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420 and blocks 602-608, the device processor may perform operations of like-numbered blocks of the method 400 and the method 600 as described, respectively.

In block 702, the device processor may estimate a data loss during the required tune-away duration. The estimated data loss may include a determination of an amount of segment data that will not be received by the device processor during the tune-away duration.

In determination block 704, the device processor may determine whether the estimated data loss is greater than the permitted data loss. In response to determining that the estimated data loss is not greater than the permitted data loss (i.e., determination block 704="No"), the device processor may permit the upcoming tune-away in block 606. The device processor may then return to block 407, and the device processor may receive scheduling information for an upcoming burst.

In response to determining that the estimated data loss is greater than the permitted data loss (i.e., determination block 704="Yes"), the device processor may prevent the upcoming tune-away in block 614. The device processor may then return to block 407, and the device processor may receive scheduling information for an upcoming burst.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 600, and 700 may be substituted for or combined with one or more operations of the methods 400, 600, and 700.

Figure 8:
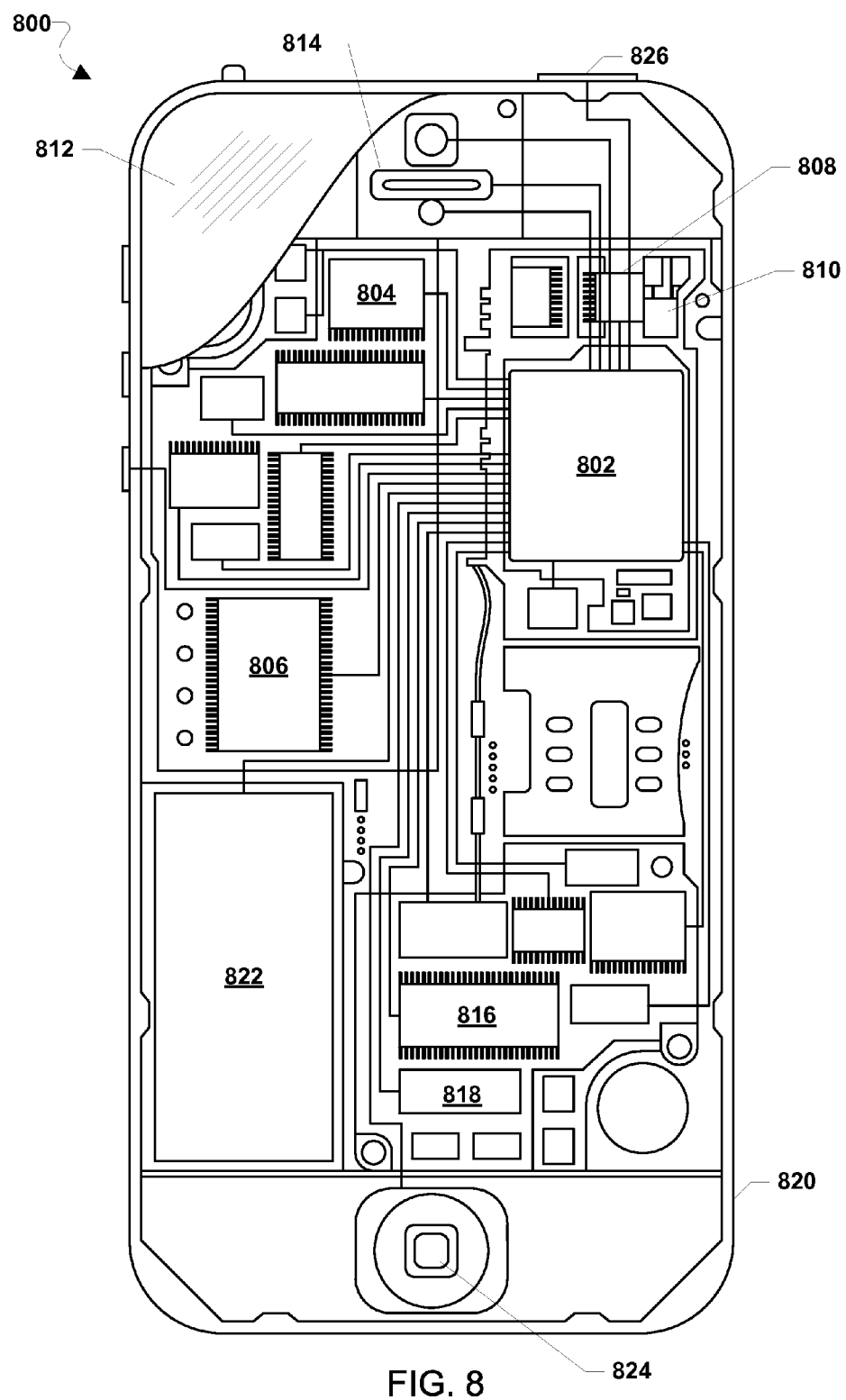
FIG. 8 is a component block diagram of a multi-subscription multi-standby communication device suitable for use with various embodiments.

Various embodiments (including, but not limited to, embodiments described with reference to FIGS. 1-7) may be implemented in any of a variety of multi-subscription multi-standby communication devices, an example of which (e.g., multi-subscription multi-standby communication device 800) is illustrated in FIG. 8. With reference to FIGS. 1-8, in various embodiments, the multi-subscription multi-standby communication device 800 (which may correspond, for example, to the multi-subscription multi-standby communication devices 102 and 200) may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the multi-subscription multi-standby communication device 800 need not have touch screen capability.

The multi-subscription multi-standby communication device 800 may have two or more radio signal transceivers 808 (e.g., Peanut, Bluetooth, ZigBee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The multi-subscription multi-standby communication device 800 may include one or more cellular network wireless modem chip(s) 816 coupled to the processor and antennae 810 that enables communication via two or more cellular networks via two or more radio access technologies.

The multi-subscription multi-standby communication device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The multi-subscription multi-standby communication device 800 may also include speakers 814 for providing audio outputs. The multi-subscription multi-standby communication device 800 may also include a housing 820, constructed of a plastic, metal, or a combination of materials, for containing all or some of the components discussed herein. The multi-subscription multi-standby communication device 800 may include a power source 822 coupled to the processor 802, such as a disposable or rechargeable battery. The rechargeable battery may also be coupled to the peripheral device connection port to receive a charging current from a source external to the multi-subscription multi-standby communication device 800. The multi-subscription multi-standby communication device 800 may also include a physical button 824 for receiving user inputs. The multi-subscription multi-standby communication device 800 may also include a power button 826 for turning the multi-subscription multi-standby communication device 800 on and off.

The processor 802 may be any programmable microprocessor, microcomputer or multiple processor chip or chips that can be configured by software instructions (applications) to perform a variety of functions, including the functions of various embodiments described below. In some multi-subscription multi-standby communication devices, multiple processors 802 may be provided, such as one processor dedicated to wireless communication functions and one processor dedicated to running other applications. Typically, software applications may be stored in the internal memory 806 before they are accessed and loaded into the processor 802. The processor 802 may include internal memory sufficient to store the application software instructions.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method implemented on a multi-subscription multi-standby communication device for managing a tune-away by a radio frequency (RF) resource supporting a first subscription to support a second subscription, comprising:
    monitoring a data loss during a first burst of a segment of a broadcast data stream received using the first subscription by the multi-subscription multi-standby communication device;
    calculating a permitted data loss of the segment of the broadcast data stream;
    reserving one or more subframes in a second burst of the segment based on the permitted data loss; and
    preventing a tune-away of the RF resource from the first subscription to the second subscription during the reserved one or more subframes of the second burst.

2. The method of claim 1, wherein the first burst and the second burst are any two bursts within the segment.

3. The method of claim 1, wherein the monitored data loss comprises a cumulative data loss from a beginning of the segment of the broadcast data stream.

4. The method of claim 1, wherein calculating the permitted data loss of the segment of the broadcast data stream comprises:
    calculating the permitted data loss of the segment of the broadcast data stream based on the monitored data loss during the first burst of the segment.

5. The method of claim 1, further comprising:
    determining whether the permitted data loss is greater than or equal to a number of subframes in the second burst,
    wherein reserving one or more subframes in a second burst based on the permitted data loss comprises reserving the one or more subframes in the second burst in response to determining that the permitted data loss is greater than or equal to the number of subframes in the second burst.

6. The method of claim 1, further comprising:
permitting a tune-away of the RF resource from the first subscription to the second subscription during unreserved subframes of the second burst.

7. The method of claim 1, wherein calculating the permitted data loss of the segment of the broadcast data stream comprises:
receiving segment size information and an error correction factor of the segment;
determining an amount of data in the segment based on the segment size information and a level of data redundancy in the segment;
determining an amount of data needed to recover the segment; and
calculating the permitted data loss of the segment based on the amount of data in the segment and the amount of data needed to recover the segment.

8. The method of claim 1, further comprising:
receiving a request to enable access to the RF resource by the second subscription;
recalculating the permitted data loss of the segment based on the monitored data loss in the first burst; and
reallocating reservation of the one or more subframes in the second burst based on the recalculated permitted data loss.

9. A method implemented on a multi-subscription multi-standby communication device for managing tune-aways by a radio frequency (RF) resource supporting a first subscription to support a second subscription, comprising:
monitoring a data loss during a burst of a segment of a broadcast data stream received using the first subscription by the multi-subscription multi-standby communication device;
calculating a permitted data loss of the segment of the broadcast data stream;
determining whether there is an upcoming overlap between a communication activity of the first subscription and a tune-away to the second subscription;
determining a required tune-away duration in response to determining that there will be an overlap between the communication activity of the first subscription and the tune-away to the second subscription;
determining a permitted data loss time based on the permitted data loss and the required tune-away duration;
determining whether the required tune-away duration is greater than the permitted data loss time; and
preventing the tune-away in response to determining that the required tune-away duration is greater than the permitted data loss time.

10. The method of claim 9, wherein the monitored data loss comprises a cumulative data loss from a beginning of the segment of the broadcast data stream.

11. The method of claim 9, further comprising:
calculating the permitted data loss based on the monitored data loss during the first burst,
wherein determining the permitted data loss time is based on the permitted data loss and the required tune-away duration.

12. The method of claim 9, wherein determining the permitted data loss time based on the permitted data loss and the required tune-away duration comprises estimating a data loss during the required tune-away duration.

13. The method of claim 12, wherein determining whether the required tune-away duration is greater than the permitted data loss time comprises determining whether the estimated data loss during the required tune-away duration is greater than the permitted data loss.

14. A multi-subscription multi-standby communication device, comprising:
a memory;
a radio frequency resource; and
a processor coupled to the memory and the radio frequency resource and configured with processor-executable instructions to:
monitor a data loss during a first burst of a segment of a broadcast data stream received using a first subscription by the multi-subscription multi-standby communication device;
calculate a permitted data loss of the segment of the broadcast data stream;
reserve one or more subframes in a second burst of the segment based on the permitted data loss; and
prevent a tune-away of the RF resource from the first subscription to a second subscription during the reserved one or more subframes of the second burst.

15. The multi-subscription multi-standby communication device of claim 14, wherein the first burst and the second burst are any two bursts within the segment.

16. The multi-subscription multi-standby communication device of claim 14, wherein the monitored data loss comprises a cumulative data loss from a beginning of the segment of the broadcast data stream.

17. The multi-subscription multi-standby communication device of claim 14, wherein the processor is further configured with processor-executable instructions to:
calculate the permitted data loss of the segment of the broadcast data stream based on the monitored data loss during the first burst of the segment.

18. The multi-subscription multi-standby communication device of claim 14, wherein the processor is further configured with processor-executable instructions to:
determine whether the permitted data loss is greater than or equal to a number of subframes in the second burst; and
reserve the one or more subframes in the second burst in response to determining that the permitted data loss is greater than or equal to the number of subframes in the second burst.

19. The multi-subscription multi-standby communication device of claim 14, wherein the processor is further configured with processor-executable instructions to:
permit a tune-away of the RF resource from the first subscription to the second subscription during unreserved subframes of the second burst.

20. The multi-subscription multi-standby communication device of claim 14, wherein the processor is further configured with processor-executable instructions to:
receive segment size information and an error correction factor of the segment;
determine an amount of data in the segment based on the segment size information and a level of data redundancy in the segment;
determine an amount of data needed to recover the segment; and
calculate the permitted data loss of the segment based on the amount of data in the segment and the amount of data needed to recover the segment.

21. The multi-subscription multi-standby communication device of claim 14, wherein the processor is further configured with processor-executable instructions to:
receive a request to enable access to the RF resource by the second subscription;
recalculate the permitted data loss of the segment based on the monitored data loss in the first burst; and
reallocate reservation of the one or more subframes in the second burst based on the recalculated permitted data loss.

22. A multi-subscription multi-standby communication device, comprising:
a memory;
a radio frequency resource; and
a processor coupled to the memory and the radio frequency resource and configured with processor-executable instructions to:
monitor a data loss during a burst of a segment of a broadcast data stream received using a first subscription by the multi-subscription multi-standby communication device;
calculate a permitted data loss of the segment of the broadcast data stream;
determine whether there is an upcoming overlap between a communication activity of the first subscription and a tune-away to a second subscription;
determine a required tune-away duration in response to determining that there will be an overlap between the communication activity of the first subscription and the tune-away to the second subscription;
determine a permitted data loss time based on the permitted data loss and the required tune-away duration;
determine whether the required tune-away duration is greater than the permitted data loss time; and
prevent the tune-away in response to determining that the required tune-away duration is greater than the permitted data loss time.

23. The multi-subscription multi-standby communication device of claim 22, wherein the monitored data loss comprises a cumulative data loss from a beginning of the segment of the broadcast data stream.

24. The multi-subscription multi-standby communication device of claim 22, wherein the processor is further configured with processor-executable instructions to:
calculate the permitted data loss based on the monitored data loss during the first burst; and
determine the permitted data loss time based on the permitted data loss and the required tune-away duration.

25. The multi-subscription multi-standby communication device of claim 22, wherein the processor is further configured with processor-executable instructions to:
estimate a data loss during the required tune-away duration.

26. The multi-subscription multi-standby communication device of claim 25, wherein the processor is further configured with processor-executable instructions to:
determine whether the estimated data loss during the required tune-away duration is greater than the permitted data loss.

* * * * *